United States Patent

Park et al.

[11] Patent Number: 5,905,241
[45] Date of Patent: May 18, 1999

[54] THRESHOLD MICROSWITCH AND A MANUFACTURING METHOD THEREOF

[75] Inventors: Kwanhum Park, Kyunsangnam-do; Youngho Gho, Tajen-si; Jeungsang Go, Tauen-si; Byungman Kwak, Kyungki-do, all of Rep. of Korea

[73] Assignee: Hyundai Motor Company, Seoul, Rep. of Korea

[21] Appl. No.: 08/865,660

[22] Filed: May 30, 1997

[51] Int. Cl.$^6$ ........................................ H01H 5/30
[52] U.S. Cl. .................... 200/409; 200/408; 337/343
[58] Field of Search ................... 200/409, 408, 200/402, 406, 181; 337/333, 342, 343

[56] References Cited

U.S. PATENT DOCUMENTS

| | | | |
|---|---|---|---|
| 2,809,261 | 10/1957 | Xenakis | 200/409 |
| 4,470,033 | 9/1984 | Hofsass | 337/343 |
| 5,010,219 | 4/1991 | Kato . | |
| 5,051,643 | 9/1991 | Dworsky et al. | 200/181 |
| 5,619,318 | 4/1997 | Yamamoto et al. . | |

FOREIGN PATENT DOCUMENTS

| | | |
|---|---|---|
| A2-709911 | 5/1996 | European Pat. Off. . |
| 2-260333 | 10/1990 | Japan . |
| 3-74022 | 3/1991 | Japan . |

OTHER PUBLICATIONS

*The Int'l. Journal of Microcircuits and Electronic Packaging*, vol. 19, No. 1, pp. 75–86, "Packaging for Silicon Micromachined Accelerometers," by M. Kniffin et al., 1996.

*Sensors and Actuators* A 54 (1996) 579–583, "Snapping microswitches with adjustable acceleration threshold" by J.S. Go et al.

*Primary Examiner*—David J. Walczak
*Attorney, Agent, or Firm*—Birch, Stewart, Kolasch & Birch, LLP

[57] ABSTRACT

A threshold microswitch includes a movable electrode, realizing an initial deflection by a difference in residual stresses; an upper electrode, provided at a fixed distance from the movable electrode; and a support mechanism, including a movable electrode support portion which supports both ends of the movable electrode such that a snap-through buckling phenomenon can be used when the movable electrode receives a threshold load. An upper electrode support portion supports the upper electrode such that switching with the movable electrode is realized when the same undergoes snap-through buckling.

11 Claims, 11 Drawing Sheets

THRESHOLD MICROSWITCH AND A MANUFACTURING METHOD THEREOF

FIELD OF THE INVENTION

The present invention relates to a microswitch, and more particularly, to a microswitch and a manufacturing method thereof, the microswitch creating a snap-through buckling phenomenon and able to be used in autotnobile airbag auxiliary sensors, micro voltage suppliers, etc. with the application of micromachining technology. Further, the present invention relates to a threshold microswitch and a manufacturing method thereof, the microswitch measuring vehicle speed and voltage and operating when over a specified threshold value.

BACKGROUND OF THE INVENTION

In recent times, there has been a shift from the use of macroswitches to microswitches in electronic goods and automobiles. The following is an explanation of the manufacturing technology of switches using a buckling phenomenon and the manufacturing technology of microswitches used for measuring acceleration.

Among switches using the buckling phenomenon, U.S. Pat. No. 5,010,219 is a push-button switch used in computers, etc., and is designed for the convenience of a user by limiting excessive buckling This switch is different from the present invention, which will be explained hereinafter, as it is a macroswitch, but similar as it uses a buckling phenomenon.

An invention related to the manufacture of a microswitch is Japanese patent number 2-260333. This invention grows a direct epitaxial layer on a silicon substrate, overcomes difficulties of growing an epitaxial layer on a P± silicon layer, and utilizes thin-film technology to manufacture the microswitch. In these respects, this invention is similar to the present invention.

There are two types of research into threshold switches which are able to adjust voltage and acceleration. One is Japanese patent number 3-74022 realized by using a spring and mass. Here, centrifugal force of mass operates on a spring by acceleration. Another involves micro threshold switches by C. Robinson (Transducers '87) involving microscale cantilever-beam acceleration switches. Here, cantilever springs, each having different masses, contact different cantilever electrodes according to changes in acceleration such that a switching operation is performed.

However, with regard to the above former invention, as it is difficult to precisely manufacture the structural elements, even in identical products, not only does thresholdness for electrode contact create speed variation, but after manufacturing, threshold acceleration peculiar to each switch can change or it can be difficult to adjust. Further, in the above latter invention, as it operates in accordance to predetermined conditions, when a range of threshold acceleration and threshold acceleration section are not successive, a plurality of switch arrays must be formed such that a size of the product is enlarged. Therefore, a mistake made in design in the manufacturing process is often difficult to correct.

SUMMARY OF THE INVENTION

The present invention has been made in an effort to solve the above problems.

It is an object of the present invention to provide a threshold microswitch and a manufacturing method thereof which integrally manufactures a mass body and a microswitch and, according to the application, can spontaneously adjust threshold acceleration or threshold voltage range and section by a method of adjusting electrode voltage, and, at the same time, can compensate for minute process errors by adjusting voltage between terminals.

It is another object of the present invention to provide a threshold microswitch and a manufacturing method thereof which allows for execution of self tests to determine performance of a microswitch and variable microswitch.

To achieve the above objects, the present invention provides a microswitch comprising a movable electrode, realizing an initial deflection by a difference in residual stresses; an upper electrode, provided at a fixed distance from the movable electrode; and support means, including a movable electrode support portion which supports both ends of the movable electrode such that a snap-through buckling phenomenon can be used when the movable electrode receives a threshold load, and an upper electrode support portion which supports the upper electrode such that switching with the movable electrode is realized when the same undergoes snap-through buckling.

The support means includes a base plate, provided at a fixed thickness; elevated portions, formed along widths of the base plate and which support the upper electrode; and a concave portion formed between the elevated portions, wide portions of which act as the movable electrode support portion, and which includes a cavity in a center of the concave portion and a bimorph beam formed extending across the cavity and supporting the movable electrode.

According to a feature of the present invention, the bimorph beam is realized through at least two membrane layers, the difference in residual stresses of the membrane layers allowing for deflection. Further, the cavity is rectangularly formed parallel to the elevated portions and has sides that are slanted downward.

The bimorph beam has a width that is smaller than that of the cavity and is longitudinally stretched over a length of the same; and wherein the movable electrode includes a narrow portion crossing a length of the bimorph beam, and wide portions which are attached to the widths of the concave portion.

The base plate is made of silicon.

An insulating member is mounted to an upper surface of the upper electrode, and adhesion electrodes are formed under the upper electrode along lengths of the elevated portions.

Adhesion grooves, filled with an adhesive, are formed along lengths of the elevated portions to bond the insulating member and upper electrode to the elevated portions.

The insulating member is made of glass.

The adhesive is a UV hardening resin.

In another aspect, a weight is formed under the bimorph beam on a center portion thereof. Also, a lower electrode is formed on a bottom surface of the weight, an indented portion is formed in a center of the base plate to form elevated ends, and an electrode is formed extending across the elevated ends on the lower side of the base plate such that switching can occur with this electrode when the bimorph beam experiences snap-through buckling.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 11 graph used to illustrate a measurement of a possible range of threshold acceleration adjustment according to voltage applied to both ends of the electrode when a weight is applied in a center part of the microswitch according to a second preferred embodiment of the present invention, and when a length of a bimorph bean of the microswitch is different.

DETAILED DESCRIPTION

Preferred embodiments of the present invention will now be described in detail with reference to the accompanying drawings.

Figure 1:
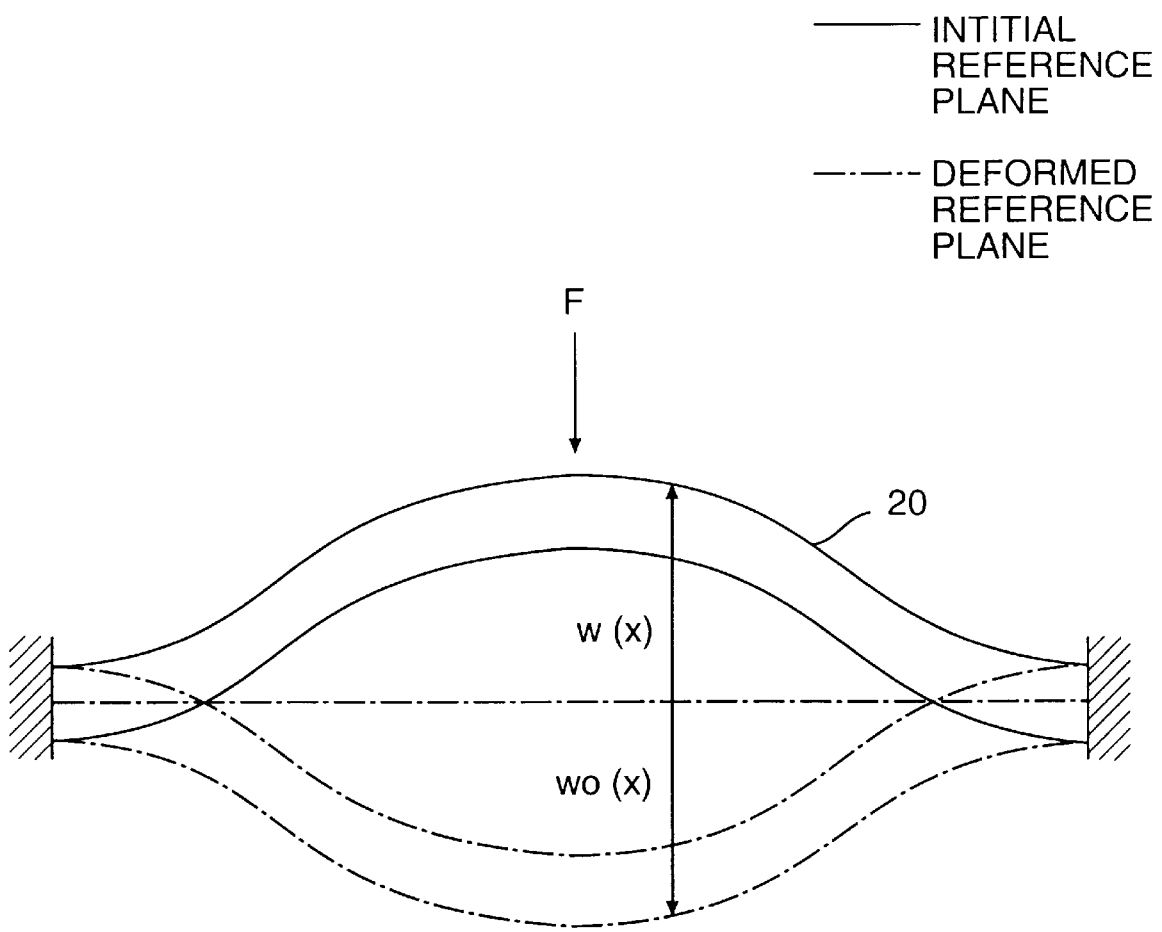
FIG. 1 is a perspective view illustrating an initial deflection of an electrode used for explaining operation principles of a microswitch according to a first preferred embodiment of the present invention
Figure 2:
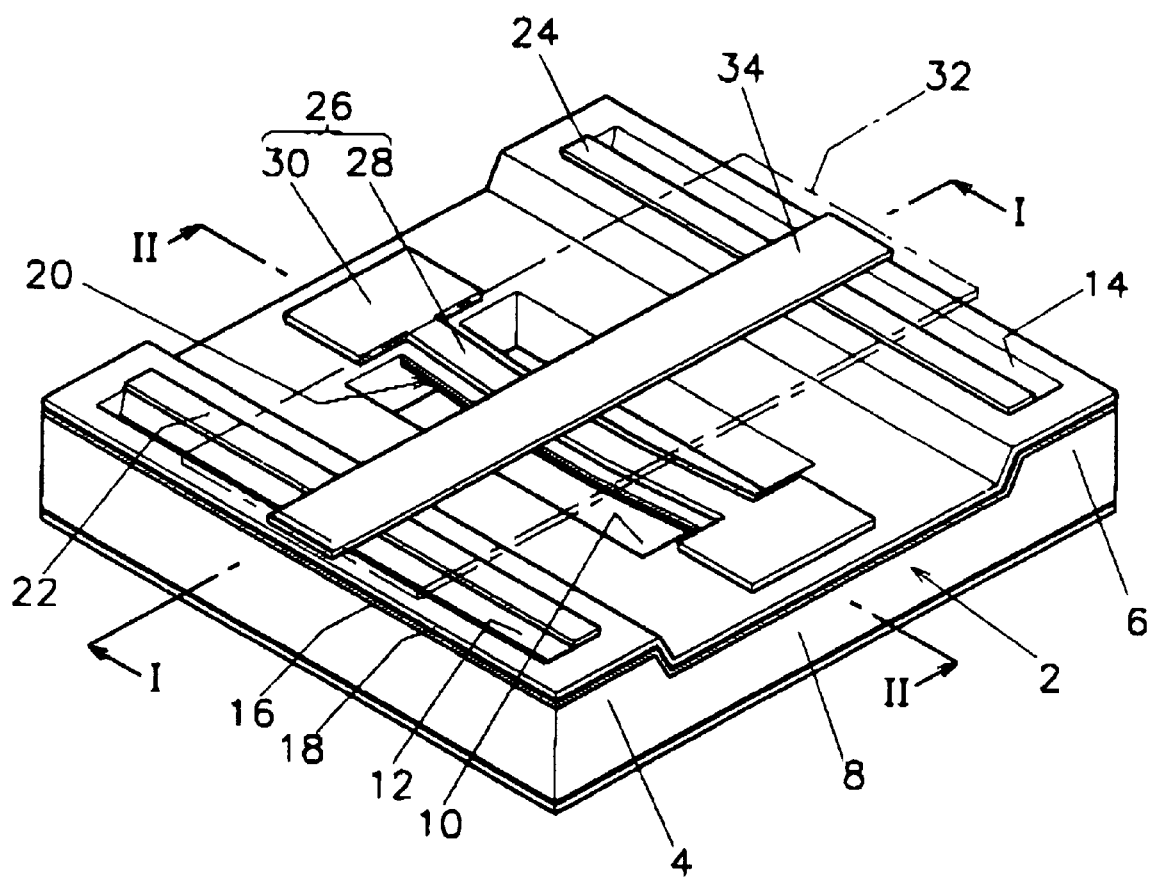
FIG. 2 is a perspective view of a microswitch according to a preferred embodiment of the present invention.
Figure 3:
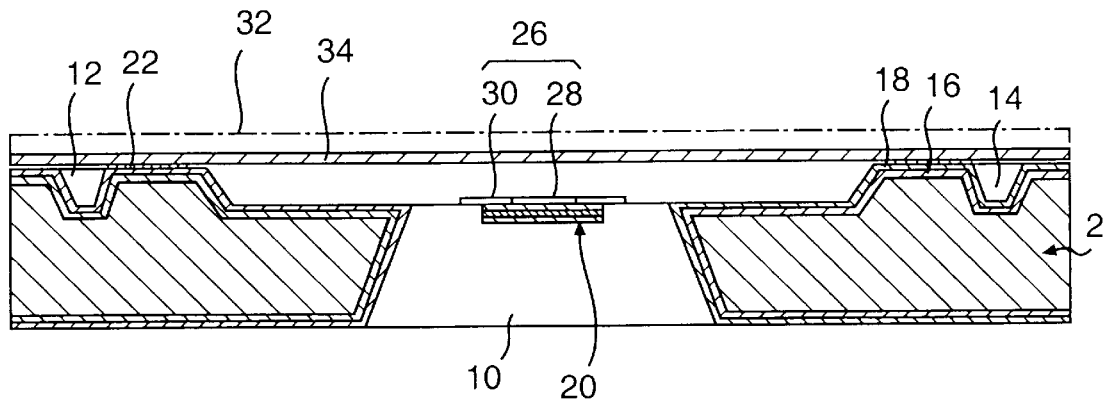
FIG. 3 is a side view taken along line I—I of FIG. 2.
Figure 4:
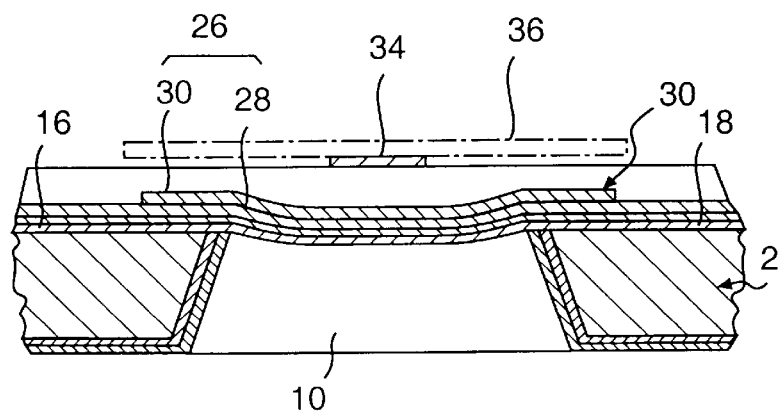
FIG. 4 is a side view taken along line II—II of FIG. 2.

FIG. 2 is a perspective view of a microswitch according to a first preferred embodiment of the present invention, FIG. 3 is a side view taken along line I—I of FIG. 2, and FIG. 4 is a side view taken along line II—II of FIG. 2. In the drawings, reference numeral 2 refers to a base plate.

Referring to FIGS. 2–4, the base plate 2 is realized through a single board made of a silicon substrate, etc. Elevated portions 4 and 6 are formed on two sides of the base plate 2, and a concave portion 8 is formed between the elevated portions 4 and 6. Further, a rectangular cavity 10, parallel to the elevated portions 4 and 6, is formed in a center of the concave portion 8, and adhesion grooves 12 and 14 are formed in both elevated portions 4 and 6 at predetermined depths. The above rectangular cavity 10 can be formed a number of different ways, but in the present invention, the cavity 10 is rectangularly formed having slanted sides made by using a non-isotropic etching process.

A bimorph beam 20 is formed extending longitudinally to connect widths of the cavity 10. The bimorph beam 20 realizes an initial deflection by slanting inward at a center portion by a difference in residual stress of internal and external films 16 and 18, formed over a top surface of the base plate 2 having different residual stress levels with the external film 18 overlapping the internal film 16.

Also, strip-type adhesion electrodes 22 and 24 are formed, respectively, on the elevated portions 4 and 6 along the lengths of the latter, and a movable electrode 26 is formed on top of the bimorph beam 20. The movable electrode 26 includes a narrow portion 28 extending along a length of the bimorph beam 20 and wide portions 30 integrally formed on both ends of the narrow portions 28.

A strip-type upper electrode 34 is provided extending from one adhesion electrode 22 to the other 24 and contacting both the same, and an insulating member 32 is fixed by adhesion over the upper electrode 34. The insulating member 32, upper electrode 34, and adhesion electrodes 22 and 24 combine to form fixed electrode means. The insulating member 32 is made of glass to minimize parasitic capacity Further, the upper electrode 34 is not limited to the strip-shape configuration as explained above and can be shaped other ways as long as an electric operation with the movable electrode 26 is realized.

The internal and external films 16 and 18 above are formed using a p+ silicon layer and thermally grown silicon dioxide, while the upper electrode 34 and the movable electrode 26 are made using aluminum layers. The above elements are not limited to these materials.

The following is an explanation of the manufacturing process of the microswitch of the present invention formed as in the above with reference to FIGS. 5A–5F.

Figure 5A:
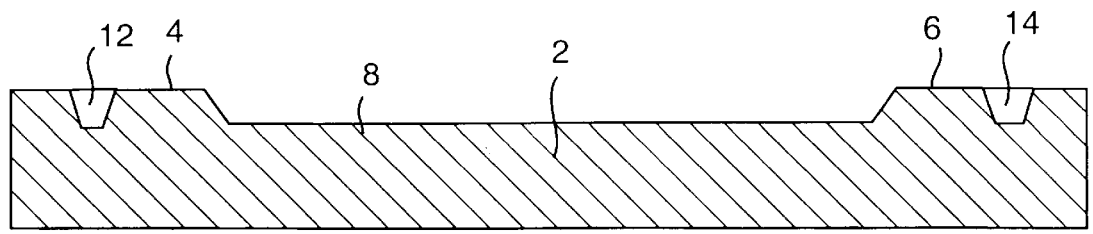
FIGS. 5A, 5B, 5C, 5D, 5E, and 5F are side views taken along line I—I of FIG. 2 used for explaining the manufacturing process.

As a first step, as shown in FIG. 5A, the elevated portions 4 and 6 are formed on the base plate 2 to allow for the switching operation. To perform this step, the base plate 2 is first cleansed, and at 900–1,100 degrees Celsius, a dry dioxide layer is formed at 300 Å. Next, using a lithography process and a buffered oxide etchant, part of the dioxide layer is removed and an etching mask is formed. The base plate 2 is then etched in a KOH solution such that the concave portion 8 is made at a depth of 8.4 µm to form the elevated portions 4 and 6. The 8.4 µm depth is an amount attained through tests and can be changed according to changes in the size of the microswitch. Here, only areas where the oxidized layer is removed are etched as etching in portions where the oxidized layer remains are prevented from being etched.

Also in the first step, the adhesion grooves 12 and 14, formed longitudinally on the elevated portions 4 and 6, are simultaneously etched with the etching performed above. It is not mandatory that the adhesion grooves 12 and 14 be formed, and other methods to form a fixed electrode can be used.

Figure 5B:
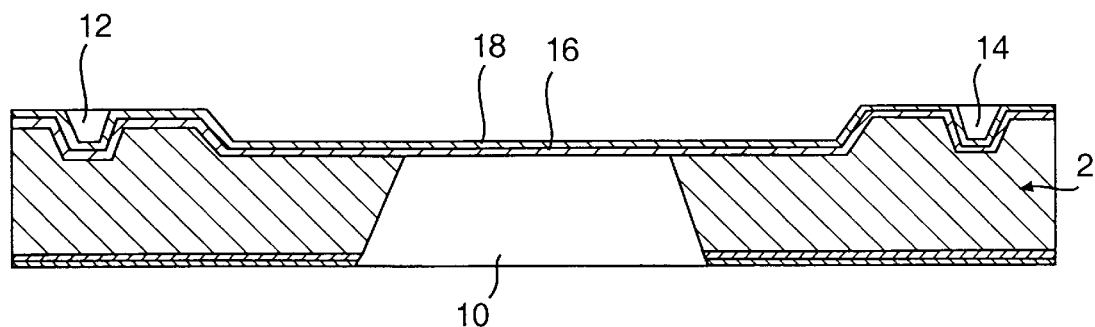

In the second step, as shown in FIG. 5b, a double layer is formed on top and bottom sides of the base plate 2. To perform this process, a boron solid is saturated on the base plate 2 for fourteen hours to form a p+ silicon layer, or the internal film 16. Here, as the p+ silicon layer 16 determines the thickness of the beam layer, the time is adjusted to attain the conditions needed for the snap through buckling effect. Next, after the boron glass layer is removed, a wet oxide layer, or the external film 18 is grown on the p+ silicon layer 16 at a thickness of 0.5 µm using a wet process at 1,000 degrees Celsius.

In the above state, a bottom side of the base plate 2 is etched to form the rectangular cavity 10. As the oxide layer masks etching by ethylene diamine pyrocatechol (EDP) water, a lithography process is used on the bottom surface of the base plate 2 to form an oxide etching window, and BOE is used to remove the oxide layer. A sensitizer and oxide layer are used for masking, and the exposed p+ silicon layer is etched using a polyetchant. Next, the exposed silicon surface is etched in a 26% KOH solution at 84 degrees Celsius for three hours, and the etchant is changed to EDP water to etch the base plate 2 for three hours.

Here, etching is first performed in the KOH solution to reduce the etching time, and by using the EDP solution to discontinue the etching process, a beam of a desired thickness can be attained. Ethylene diamine, pyrocatechol, and water are mixed at a 3:1:1 ratio to make the EDP solution, and with such a mixture silicon etching is realized at a rate of 0.84 µm/min.

Figure 5C:
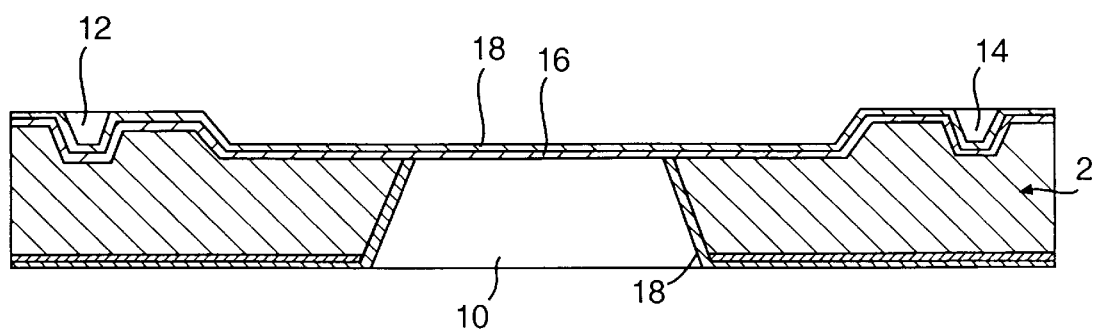

In the third step, as shown in FIG. 5C, an oxide layer is formed such that initial deflection can be generated. Here, a dry oxide layer 18 is grown at a thickness of 300 Å at 900 Å degrees Celsius.

Figure 5D:
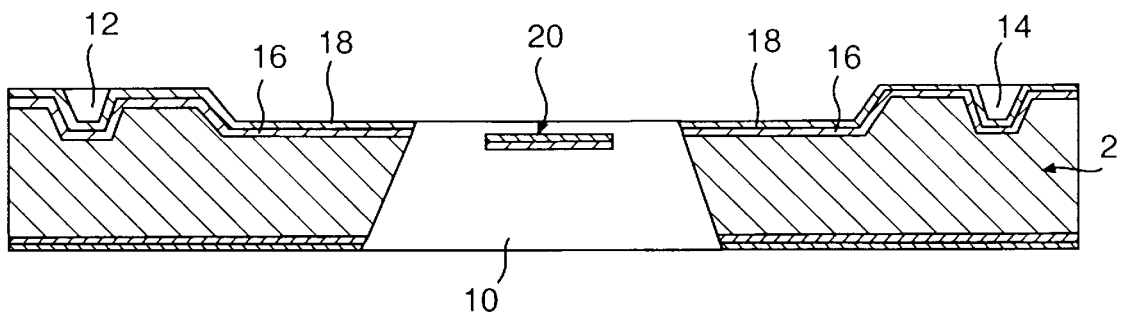

Referring to FIG. 5D, the bimorph beam 20 is formed in the fourth step. Here, a lithography process is used to form a beam and the external film 18 is removed in areas where the sensitizer has been removed. Also, if the p+ silicon layer is etched using a polyetchant, a beam having an initial deflection is realized.

In the above, when using a polyetchant to etch the p+ silicon layer, the masking time of the sensitizer is limited to 3 minutes. Accordingly, the lithography process must be repeated three times to remove all of the p+ silicon layer and complete the forming of the bimorph beam 20.

Figure 5E:
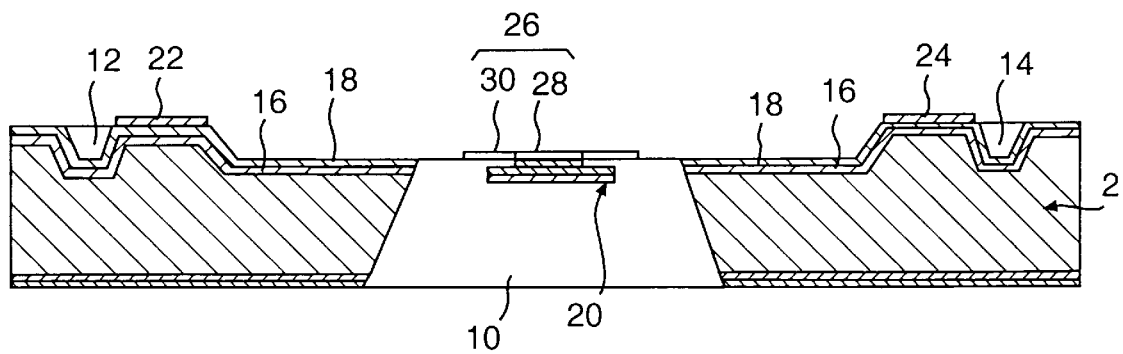

Referring now to FIG. 5E, electrodes are formed in the fifth step. Electrodes are formed on the bimorph beam 20 and the elevated portions 4 and 6 using a lithography process and an aluminum etchant (to shape the electrodes).

Figure 5F:
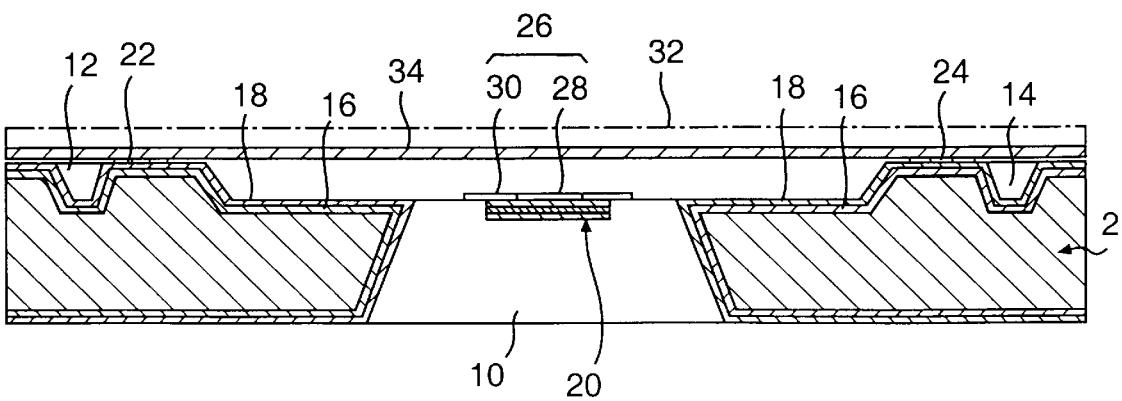
Figure 6:
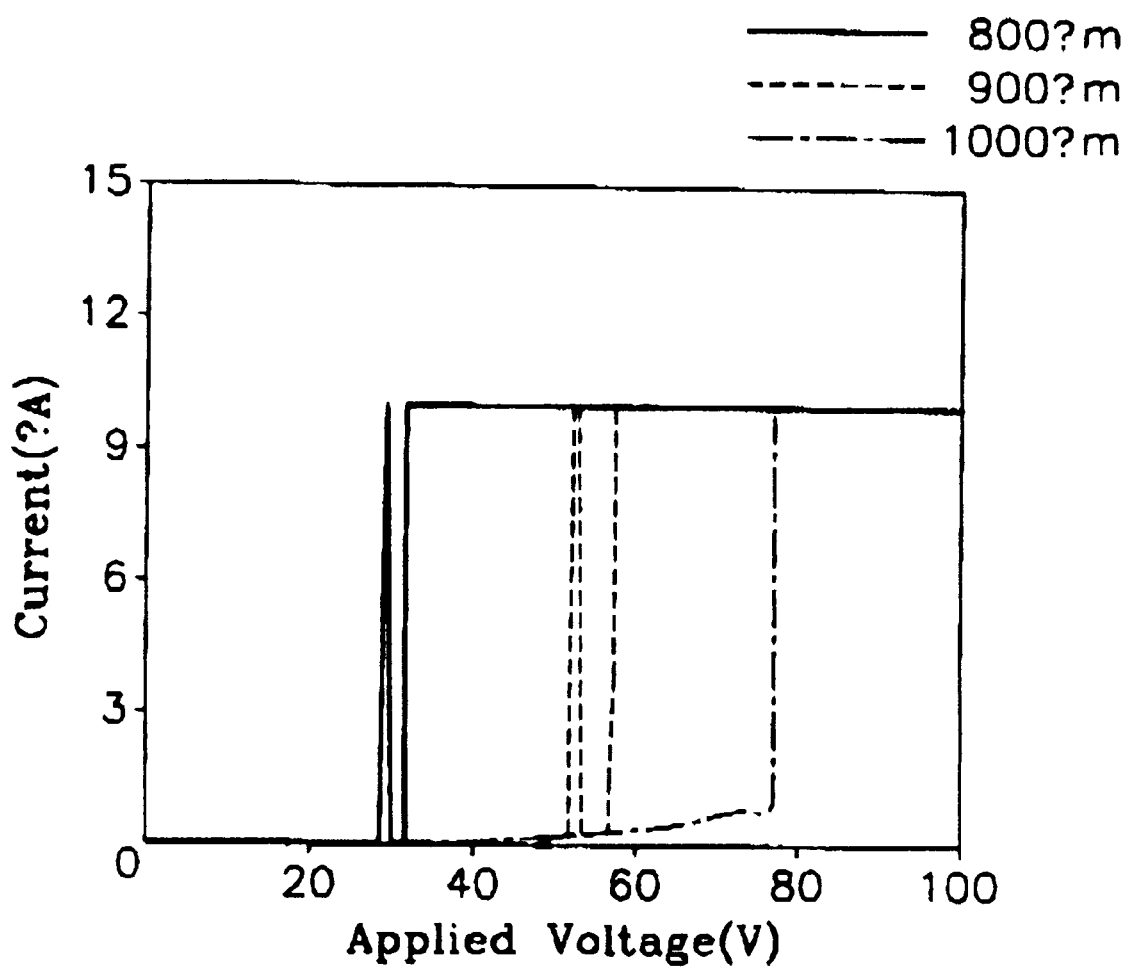
FIG. 6 is graph used to illustrate a measuring performance test of the amount of connection current applied between electrodes of the microswitch according to a preferred embodiment of the present invention.

In the sixth step, as shown in FIG. 5F, the glass insulating member 32 is attached to the base plate 2 and a completed microswitch is made. Here, to bond the insulating member 32 to the base plate 2, a UV hardening resin is filled overflowing in the adhesion grooves 12 and 14 of the elevated portions 4 and 6 such that the insulating member 32 can be attached thereon. However, if the adhesion grooves 12 and 14 are not formed in the elevated portions 4 and 6 of the base plate 2, an anodic bonding or an eutectic bonding process can be used to bond the insulating member 32.

In the above, anodic bonding gives a high difference in potential (200–2,000 V) between glass and metal, while in eutectic bonding a eutect temperature is used which allows fusion at a minimal temperature, and a metal alloy or a tin alloy is used for bonding at the low temperature.

In the manufacturing process explained above of the present invention, the various conditions (lengths of time, etching solution mixing rates, thicknesses, etc.) are those determined to be ideal through experimentation. However, there is no limitation to using the above-mentioned conditions and they can be altered according to changes in the size, capacity, etc. of the microswitch.

Performance tests of the microswitch manufactured using the above process were performed measuring the modulus of elasticity and residual stress of the materials, and the size of the manufactured microswitch was measured.

A pressurized blister test was used to measure the modulus of elasticity and residual stress. In the blister test, pressure is applied to square membranes to measure deflection, and the relation between the pressure and change in shape result in attaining values for the modulus of elasticity and residual stress. In this measuring method, deflection energy is theoretically measured using assumptions of membrane displacement distribution, and after a load-deflection relation formula is attained, displacement distribution, attained using an ABAQUS program, is compared and a relation formula of the load and deflection is attained. The load-deflection relation is expressed as:

$$\frac{Pa^2}{wt} = 1.37(1.493 - 0.431dv)\frac{E}{1-v}\frac{w^2}{a^2} + 3.49\sigma_0$$

where P is the pressure; a, the length of square membrane; w, the maximum deflection of the square member; t, the membrane thickness; v, the Poisson's ratio; and $\sigma_0$, the initial residual stress.

For the bimorph square membrane, the compensated load-deflection relation is expressed as:

$$\frac{Pa^2}{w} = 1.37(1.493 - 0.431v_1)\frac{E_1 t_1}{1-v_1}\frac{w^2}{a^2} + 3.49\sigma_{01}t_1 +$$

$$1.37(1.462 - 0.36v_2)\frac{E_2 t_2}{1-v_2}\frac{w^2}{a^2} + 3.59\sigma_{02}t_2$$

where $\sigma_i$, $t_i$, $E_i$ denote the residual stress and thickness, and Young's modulus of each film. The above blister measurement is used to measure the p+ silicon, aluminum, and thermal oxidation layers. The p+ silicon layer is a square membrane having the following dimensions: 2.84 mm×2.84 mm×1.0 $\mu$m. The p+ silicon and aluminum compound layer has the dimensions of 2.84 mm×2.84 mm×1.5 $\mu$m, with the thickness of the aluminum being 0.5 $\mu$m. Also, the p+ silicon and thermal oxidation compound layer has the dimensions of 2.84 mm×2.84 mm×1.032 $\mu$m, with the thickness of the thermal oxidation layer being 300 Å. Micromechanical properties and residual stress measured from the pressurized membrane test are summarized in the following table.

| Materials | E(Pa) ± 6.5% | $\sigma_0$(MPa) ± 13% | v |
|---|---|---|---|
| p +− Si | 125 | +77 | 0.28 |
| Al | 65 | −15 | 0.31 |
| SiO2 | 72 | −240 | 0.17 |

Further, the sizes of the three bimorph beams used in the present invention are as follows. The width of all the bimorph beams is 230 $\mu$m, while the lengths are 800 $\mu$m, 900 $\mu$m, and 1,000 $\mu$m, respectively. Also, the bimorph beams of the present invention are realized through a compound structure using p+ silicon, oxidation, and aluminum, and the thickness of the layers are, respectively, 2.5 $\mu$m, 320(+30) Å, and 0.5 $\mu$m. In addition, initial deflections for the beams were measured at 6.5, 8.7, 11.7(6.5%) $\mu$m, respectively. Here, beam deflection increases as beam length increases.

In the present invention, the threshold voltage, causing the snap-through buckling phenomenon according to the length of the bimorph beam 20, is measured for each microswitch made as in the above to check for operability of the same.

In the snap-through buckling tests, a semiconductor parameter analyzer was used to measure the flow of electricity according to the applied voltage. In the test results, when the lengths of the bimorph beams are 800, 900, and 1,000 $\mu$m, the threshold voltages are measured as 32, 56, and 76.5 V, respectively.

As shown in the following table, discrepancies between the estimated and the measured threshold voltages and beam deflections were found.

| Beam length | Beam deflection ($\mu$m) | | Threshold voltage (V) | |
|---|---|---|---|---|
| ($\mu$m) | Measured | Estimated | Measured | Estimated |
| 800 | 6.5 ± 0.8 | 7.1 | 32 | 10.0 |
| 900 | 8.7 ± 1.0 | 8.9 | 56.3 | 27.5 |
| 1000 | 11.7 ± 1.4 | 11.0 | 76.5 | 40.0 |

The sources of error between the above measured and estimated values comes from uncertainty in the measured mechanical properties and residual stresses of the materials, built-in stresses in the deflected beam, and snap-buckling thresholds. In spite of these errors, the present invention is able to control residual stresses by controlling thicknesses of the layers to manufacture microswitches with the required capacities.

Microswitches manufactured according to the present invention are designed such that performance can be determined by the switches themselves. These performance self-tests are executed in the following manner. When predetermined degrees of voltage are applied, according to the lengths of the bimorph beams, between ends of electrodes, snap-through buckling occurs. If manufacturing has not been done according to desired design conditions or it the electrodes have become damaged, the electrodes can not realize the snap-through buckling. Accordingly, if voltage does not flow through the electrodes that have been manufactured improperly, or if the wrong level of current is flowing through the electrodes, it can be detected that a problem in the microswitch performance exists. Through this process, a self test on the performance of the microswitch of the present invention can be performed.

In the second embodiment of the present invention, part the design of the microswitch according to the first embodiment explained above is changed.

Figure 7:
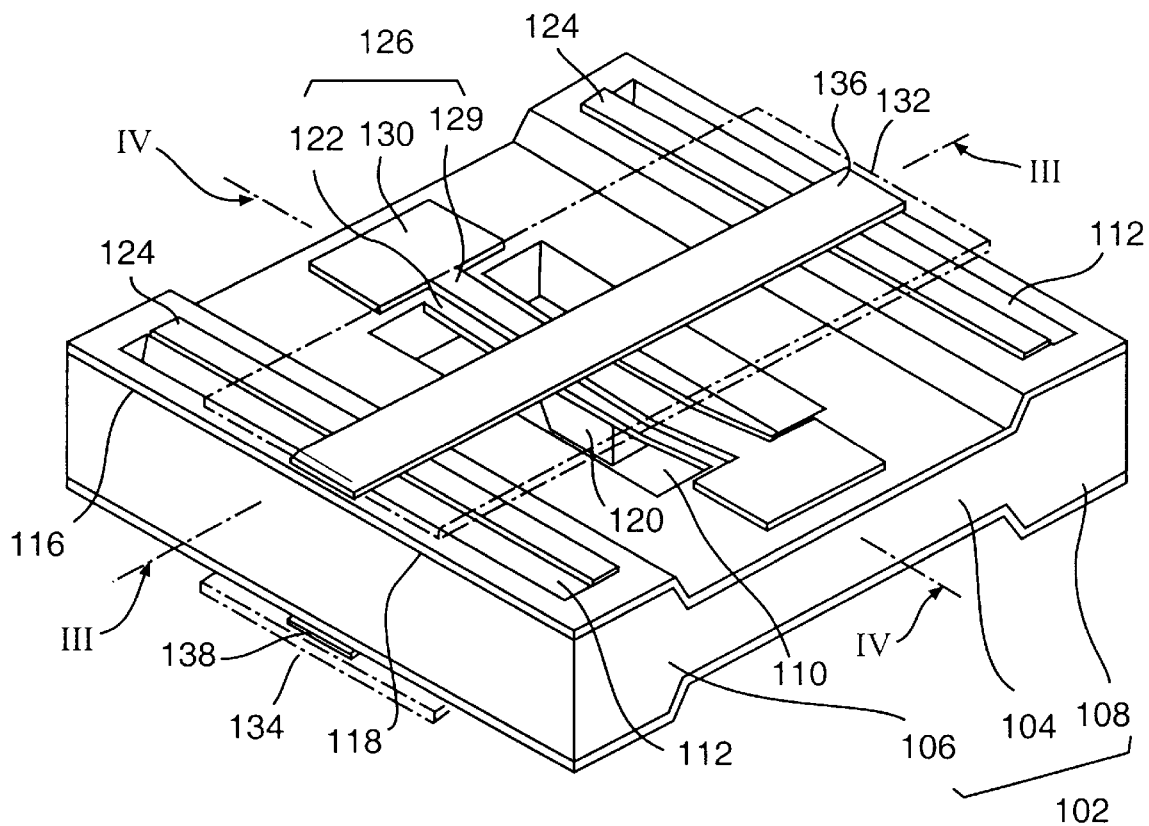
FIG. 7 is a perspective view of a microswitch according to a second preferred embodiment of the present invention.
Figure 8:
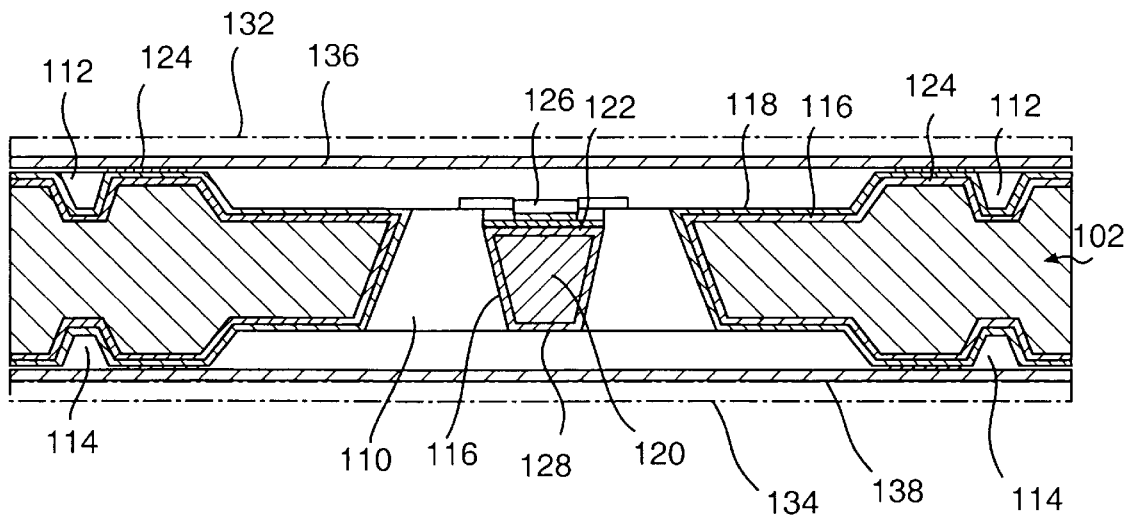
FIG. 8 is a side view taken along line III—III of FIG. 8.
Figure 9:
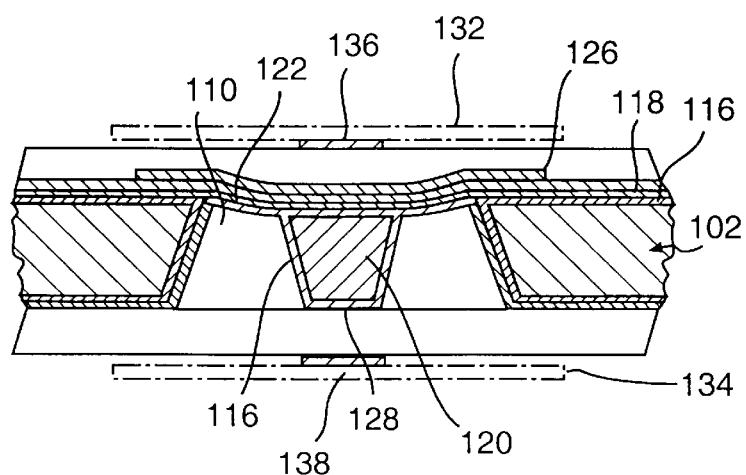
FIG. 9 is a side view taken along line IV—IV of FIG. 8.

The following is an explanation of the structure of the second embodiment with referring to FIGS. 7–9. An addition was made to the first embodiment as in the following. That is, a weight 120 is formed under a center of a bimorph beam 122, and a lower electrode 128 is formed on a lower face of the weight 120. Also, a glass lower insulating member 134, forming another electrode 138, is mounted to a lower side of a base plate 102 such that the lower electrode 128 can undergo a switching operation.

The base plate 102 is formed such that an indented portion 104 is formed concaved longitudinally on both upper and lower sides of the base plate 102 to further form elevated ends 106 and 108.

Further, a cavity 110 is formed longitudinally in a center of the indented portion 104, and upper adhesion grooves 112 and lower adhesion grooves 114 are formed longitudinally at predetermined depths respectively on upper and lower sides of the elevated ends 106 and 108. The cavity 110 is formed such that its four sides slant downward.

The bimorph beam 122 is strip-shaped, and the weight 120 formed under the bimorph beam 122 is shaped as an upside-down trapezoid when viewed from one side.

Internal and external layers 116 and 118, having different residual stress levels, are formed above the bimorph beam 122, and the weight 120, suspended by the bimorph beam 122, is covered with the internal layer 116 on five sides that are not in contact with the bimorph beam 122. A lower face of the weight 120 acts as the lower electrode 128.

Strip-type adhesion electrodes 124 are provided longitudinally on upper surfaces of the elevated ends 106 and 108, and a movable electrode 126 is formed on an upper face of the bimorph beam 122. The movable electrode 126 is formed on top of the bimorph beam 122 including a narrow portion 129 extending along a length of the bimorph beam 122 and wide portions 130 integrally formed on both ends of the narrow portions 128.

A glass upper insulating member 132 is provided extending across the elevated ends 106 and 108 on an upper side of the base plate 102. Respectively formed on the lower and upper insulating members 134 and 132, in the same direction as the same, are strip-type electrodes 138 and 136. The electrodes 138 and 136 are formed crossing over the movable electrode 126 formed on the weight 120.

As in the first embodiment, the upper and lower insulating members 132 and 134 are bonded to the base plate 102 by filling the adhesion grooves 112 and 114 with a UV hardening resin to overflow in the same such that the insulating members 132 and 134 can be attached thereon. Also, an anodic bonding or an eutectic bonding process can be used.

The following is an explanation of the manufacturing process of the microswitch of the present invention formed as in the above with reference to FIGS. 10A–10H.

Figure 10A:
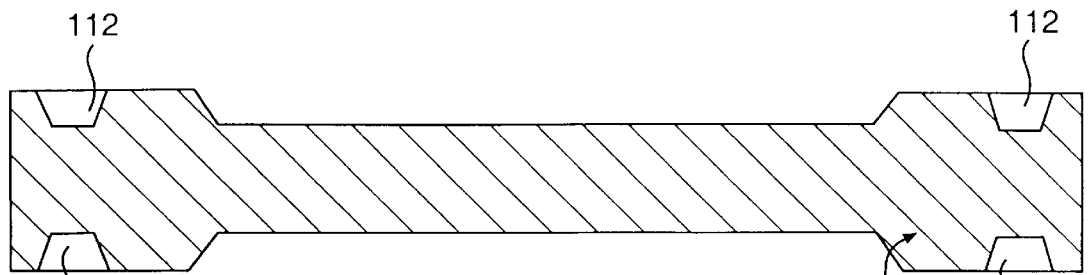
FIGS. 10A, 10B, 10C, 10D, 10E, 10F, 10G and 10H are side views taken along line III—III used for explaining the manufacturing process.

As a first step, as shown in FIG. 10A, the elevated ends 106 and 108 are formed on the base plate 102 to allow for the switching operation, and, at the same time, the upper and lower adhesion grooves 112 and 114 are etched.

Figure 10B:
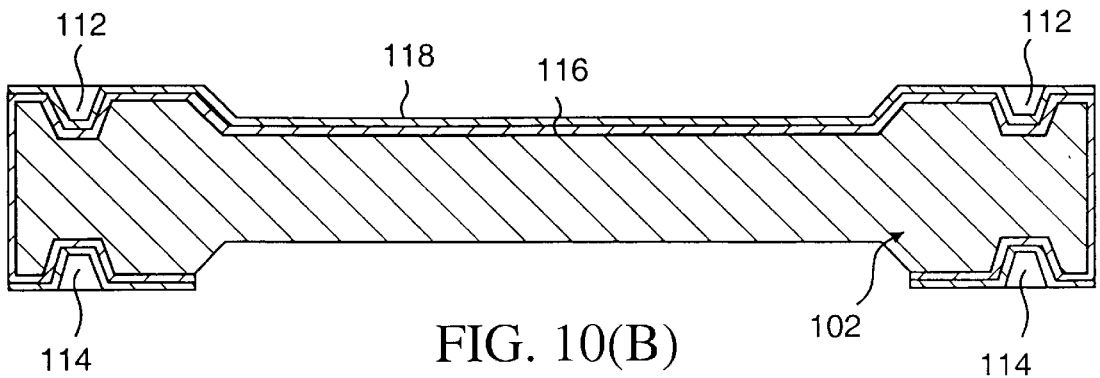

In the second step, with reference to FIG. 10B, beam thickness is determined by growing a double layer on the base plate 102. To perform this process, a boron solid is saturated on the base plate 102 to form a p+ silicon layer, or the internal layer 116. Next, a wet oxide layer, or the external layer 118 is grown on the p+ silicon layer 116 using a wet process. This double layer of internal and external layers 116 and 118 operate as residual stress layers. After the forming of the double layer, part of the internal and external layers 116 and 118 is removed on the lower and central part of the base plate 102 such that the rectangular cavity 110 can be formed.

Figure 10C:
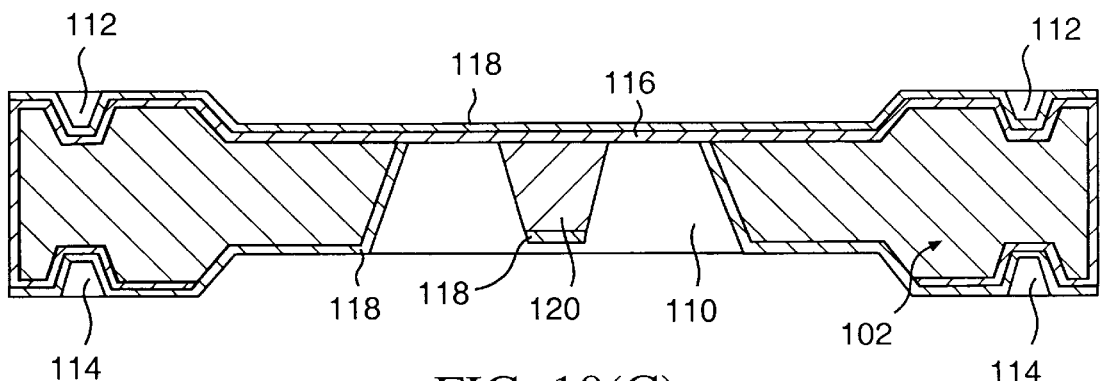

In the third step, as shown in FIG. 10C, an etch-preventing layer, over a predetermined area, is applied to part of the portion where internal and external layers 116 and 118 were removed to form the rectangular cavity 110 in the second step. Next, etching is performed to form the weight 120.

Figure 10D:
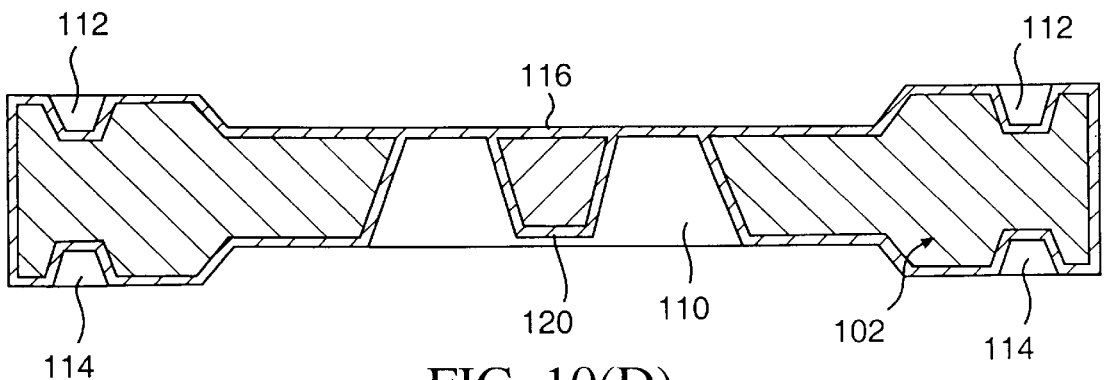

Referring to FIG. 10D, in the fourth step, after the external layer 118 is formed boron is saturated to form the internal layer 116 over the entire surface of the base plate 102, and the internal layer 116 formed over an outside surface of the weight 120 acts as an electrode.

Figure 10E:
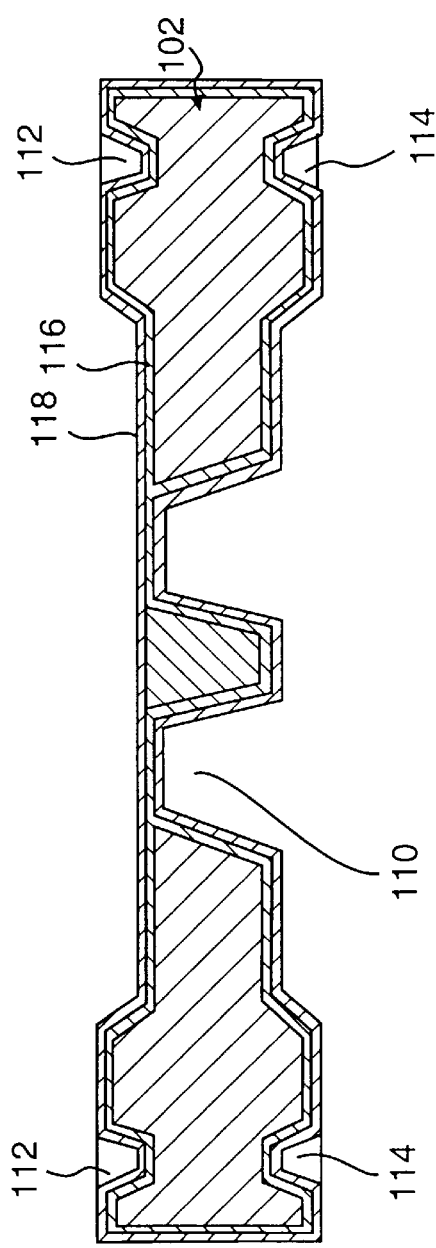

In the fifth step, with reference to FIG. 10E, a thermal oxide layer is formed over the internal layer 116 such that a double layer, realized through the internal and external layers 116 and 118, is formed.

Figure 10F:
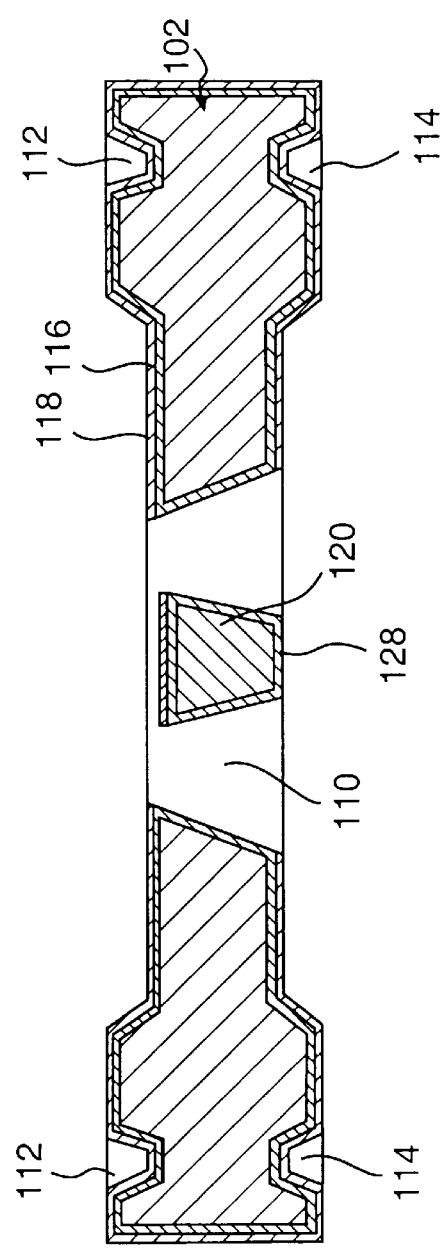

In the sixth step, as shown in FIG. 10F, after an etch-preventing layer over the upper surface of the base plate 102, the internal and external layers 116 and 118 are etched on the upper surface of the base plate 102 where the cavity is formed 110, and during the process, the bimorph beam 122, which deflects from a difference in residual stresses, is formed. During this process of etching the bimorph beam 122, the external layer 118 on the lower surface is partly etched and the internal layer 116 is exposed.

Figure 10G:
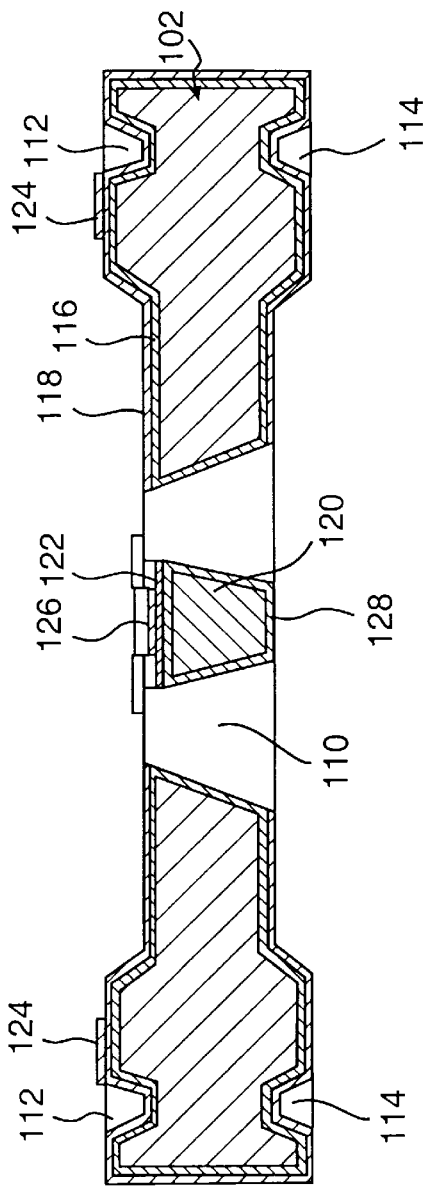
Figure 10H:
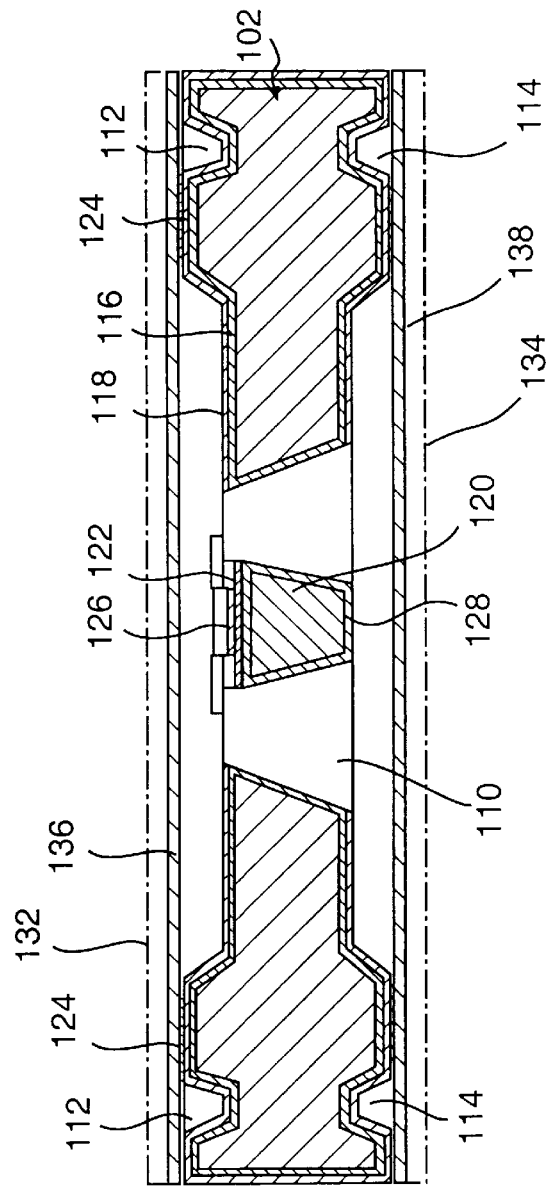

Referring to FIG. 10G, in the seventh step, the movable electrode 126 if formed on an upper surface of the bimorph beam 122, and adhesion electrodes 124 are formed on the elevated ends 106 and In the eighth step, as shown in FIG. 10H, after an upper insulating member 132 and an electrode 136 and a lower insulating member 134 and an electrode 138 are formed crossing over the weight 120 respectively on upper and lower sides, are bonded to the elevated ends 106 and 109 by the upper and lower adhesion grooves 112 and 114 which are filled with an adhesive. The microswitch is completed after this step.

The operating of the threshold variable microswitch formed as in the above is identical to that of the first embodiment, but has the special feature of allowing for the switching operation in both upper and lower directions. Also, the testing conditions for the second embodiment are identical to that of the first embodiment.

Tests on threshold acceleration and threshold voltages were run on the microswitch of the second embodiment. The test results appear in FIG. 11 where the relation between threshold acceleration and applied voltage is shown. When 7 μg of silicon is attached on the bimorph beam 122 (i.e., the weight 120), the snap-through buckling phenomenon can be seen as a compound force of static electricity force according to the application of inertia force and voltage according to acceleration. FIG. 11 illustrates that when voltage is changed from 0–32 V, 0–56 V, and 0–76.5 V, respectively according to lengths of 800 μm, 900 μm, and 100 μm, through the adjustment of the inter-electrode bias voltage, the threshold acceleration level each microdevice is tunable within the range 0–14, 0–35, and 0–47 g, respectively.

Here, the 7 μg proof mass of the weight 120 is determined by the size and length of the weight of 230 mm×230 μm and 100 μm.

Self-tests are run in the second embodiment as in the first embodiment.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A threshold microswitch, comprising:

a movable electrode having a first end and a second end;

an upper electrode, provided at a fixed distance from the movable electrode; and support means, including a movable electrode support portion which supports both ends of the movable electrode, said support means further including a bimorph beam having at least two membrane layers which support said moveable electrode such that a snap-through buckling phenomenon occurs when the movable electrode receives a threshold load, said moveable electrode realizing an initial deflection by a difference in residual stresses of said membrane layers, and an upper electrode support portion which supports the upper electrode such that switching with the movable electrode is realized when the moveable electrode undergoes snap-through buckling.

2. The threshold microswitch of claim 1, wherein the support means includes:

a base plate, provided at a fixed thickness;

elevated portions, formed along widths of the base plate and which support the upper electrode; and a concave portion formed between the elevated portions, wide portions of which act as the movable electrode support portion, and which includes a cavity in a center of the concave portion and said bimorph beam formed extending across the cavity and supporting the movable electrode.

3. The threshold microswitch of claim 2, wherein the cavity is rectangularly formed parallel to the elevated portions and has sides that are slanted downward.

4. The threshold microswitch of claim 2, wherein the bimorph beam has a width that is smaller than that of the cavity and is longitudinally stretched over a length of the cavity; and wherein the movable electrode includes a narrow portion crossing a length of the bimorph beam, and wide portions which are attached to the widths of the concave portion.

5. The threshold microswitch of claim 2, wherein the base plate is made of silicon.

6. The threshold microswitch of claim 2, wherein an insulating member is mounted to an upper surface of the upper electrode, and adhesion electrodes are formed under the upper electrode along lengths of the elevated portions.

7. The threshold microswitch of claim 6, wherein adhesion grooves, filled with an adhesive, are formed along lengths of the elevated portions to bond the insulating member and upper electrode to the elevated portions.

8. The threshold microswitch of claim 6, wherein the insulating member is made of glass.

9. The threshold microswitch of claim 7, wherein the adhesive is a UV hardening resin.

10. The threshold microswitch of claim 2, wherein a weight is formed under the bimorph beam on a center portion thereof.

11. The threshold microswitch of claim 10, wherein a lower electrode is formed on a bottom surface of the weight, an indented portion is formed in a center of the base plate to form elevated ends, and an electrode is formed extending across the elevated ends on the lower side of the base plate such that switching can occur with this electrode when the bimorph beam experiences snap-through buckling.

* * * * *